(12) United States Patent
Baudot et al.

(10) Patent No.: US 8,466,304 B2
(45) Date of Patent: Jun. 18, 2013

(54) METHOD OF PRODUCING ALKYL ESTERS FROM VEGETABLE OR ANIMAL OIL AND AN ALIPHATIC MONOALCOHOL USING MEMBRANE SEPARATION

(75) Inventors: Arnaud Baudot, Vernaison (FR); Laurent Bournay, Chaussan (FR); Eszter Toth, Lyons (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 552 days.

(21) Appl. No.: 12/644,126

(22) Filed: Dec. 22, 2009

(65) Prior Publication Data
US 2010/0186290 A1    Jul. 29, 2010

(30) Foreign Application Priority Data

Dec. 23, 2008   (FR) ..................... 08 07415

(51) Int. Cl.
*C11C 3/00* (2006.01)
*C10L 1/18* (2006.01)

(52) U.S. Cl.
USPC ........... 554/169; 554/124; 554/170; 554/174; 44/385; 44/388

(58) Field of Classification Search
None
See application file for complete search history.

(56) References Cited

U.S. PATENT DOCUMENTS 6,620,958 B2 *   9/2003   Buchanan et al. ............. 558/277
2008/0250700 A1 * 10/2008   Tremblay et al. ............... 44/301

FOREIGN PATENT DOCUMENTS

DE    102007016157 A1 * 10/2008
EP    1 616 853           1/2006

OTHER PUBLICATIONS

Dube, M.A., et al., Biodiesel production using a membrane rector, 2007, Bioresource Technology, vol. 98, pp. 639-647.*
He, H.Y. et al., "Comparison of membrane extraction with traditional extraction methods for biodiesel production," Journal of the American Oil Chemists Society, May 2006, vol. 83, No. 5, pp. 457-460.
International Search Report for EP 09290890 dated Apr. 27, 2010.
Tremblay, A.Y. et al., "Biodiesel Production Using Ultralow Catalyst Concentrations," Energy & Fuels, 2008, vol. 22, pp. 2748-2755.

* cited by examiner

*Primary Examiner* — Yate K Cutliff
(74) *Attorney, Agent, or Firm* — Millen, White, Zelano & Branigan, P.C.

(57) ABSTRACT

The present invention describes a method of producing fatty acid alkyl esters and glycerin implementing a set of transesterification reactions between a vegetable or animal oil and an aliphatic monoalcohol in the presence of a heterogeneous solid catalyst so as to obtain an effluent comprising at least alkyl esters, free glycerol, bonded glycerol and alcohol, wherein at least one stage of separation of at least a portion of the effluent is carried out in order to separate the ester produced and the bonded glycerol, said separation occurring through a membrane.

14 Claims, 4 Drawing Sheets

METHOD OF PRODUCING ALKYL ESTERS FROM VEGETABLE OR ANIMAL OIL AND AN ALIPHATIC MONOALCOHOL USING MEMBRANE SEPARATION

FIELD OF THE INVENTION

The invention relates to an improved method of producing alkyl esters from vegetable or animal oils and an aliphatic monoalcohol.

BACKGROUND OF THE INVENTION

Vegetable oil alkyl esters intended to be used as biofuel are produced from vegetable oils obtained for example from rapeseed, sunflower, soybean or even palm. Ill-suited for directly feeding modern diesel engines of private cars, vegetable oils essentially consisting of triglycerides have to be converted by means of a transesterification reaction with an alcohol, methanol or ethanol for example, introduced in excess to produce vegetable oil methyl or ethyl esters (VOME or VOEE) and glycerin.

The Esterfip-H™ process developed by IFP and described in patent application EP-1,352,893 allows to obtain a biodiesel and a glycerin of very good quality, with high yields. The flowsheet of this process consists of two fixed-bed transesterification reactors using a solid heterogeneous catalyst, operating on a continuous basis and arranged in series, which allows conversion to be maximized. The effluent from the first reactor is subjected to partial evaporation so as to remove the excess methanol introduced. The glycerin formed is thus made insoluble and it can be separated by decantation. Removal of the glycerin allows to favourably shift the reaction equilibrium and to maximize conversion in the second reactor.

The current European standard EN 14,214 for biofuels sets maximum methanol, water, free glycerol, mono-, di- and tri-glyceride contents: 0.2% by mass for methanol, 500 mg/kg for water, 0.02% by mass free glycerol, 0.8% by mass monoglycerides, 0.2% by mass di- and tri-glycerides.

What is referred to as glycerol is the molecule of the trialcohol having three carbon atoms whose chemical formula is $C_3H_8O_3$.

Free glycerol, as opposed to bonded glycerol, is defined as a glycerol molecule totally detached from any carbon chain and of formula $C_3H_8O_3$.

Glycerol is referred to as bonded when the functional group of glycerol $C_3H_8O_3$ is alkylated to one or more fatty acid chains giving monoglyceride, diglyceride or triglyceride molecules.

In the particular case of the Esterfip-H™ process, the methyl esters and the glycerol are very poorly soluble and the methanol present acts as a co-solvent. Thus, the higher the temperature and the higher the methanol content, the higher the glycerol content of the ester phase.

Besides, pure glycerol has a density close to $1.2 \text{ g}\cdot\text{cm}^{-3}$, whereas the density of the ester is around $0.9 \text{ g}\cdot\text{cm}^{-3}$. In the presence of a small proportion of methanol, the phase predominantly containing glycerol is therefore denser than the ester phase and it thus tends to come below the latter under the effect of gravity. The ester phase thus is the supernatent phase.

The glycerol according to the invention can also come in form of glycerin. Glycerin can be defined as a mixture comprising at least 50 wt. % glycerol, as well as water, methanol, salts, glycerin-free organic matter.

The vegetable and/or animal oils used can be any oil known to the person skilled in the art such as, for example, rapeseed, palm, sunflower, soybean, coprah, castor oil, as well as oils of animal origin such as tallow or oils obtained from algae.

The alcohol used is generally an aliphatic monoalcohol. Preferably, the alcohol essentially consists of methanol and/or ethanol.

The Esterfip-H™ process as described in the prior art is diagrammatically shown in FIG. 1.

The oil to be treated or feed oil (A) is sent to a vacuum drier (1) in order to obtain a water content below 700 ppm by mass. What is referred to as "dried oil" in the text hereafter is the feed oil that has been subjected to this treatment.

The dried oil is mixed with recycle methanol (B). The mixture obtained, containing between 20% and 80% by mass, preferably between 45% and 55% by mass of oil, is compressed to between $30\cdot 10^5$ and $80\cdot 10^5$ Pa, preferably $40\cdot 10^5$ and $70\cdot 10^5$ Pa, and heated to a temperature ranging between 423° and 493° K., preferably between 433° and 473° K., and it flows upward through a tubular reactor (2) containing a fixed bed of a catalyst based on zinc aluminate in form of extrudates. The LHSV, i.e. the ratio of the hourly volume flow rate of oil to be treated to the volume of catalyst, ranges between $1.2 \text{ h}^{-1}$ and $0.1 \text{ h}^{-1}$, preferably between $0.7 \text{ h}^{-1}$ and $0.3 \text{ h}^{-1}$.

The oil conversion obtained under such conditions is at least 90% by mass, generally at least 92% by mass. At the outlet of reactor (2), mixture (C) predominantly contains methyl esters, methanol, glycerol and partly converted glycerides (monoglycerides, diglycerides and triglycerides), as well as traces of water, an impurity present in the feed. This mixture is subjected to a stage of expansion, then of evaporation of the excess methanol in an evaporator (3) at a pressure close to $2.5\cdot 10^5$ Pa. The methanol vapour is condensed in a condenser (4) and recycled to the reaction sections via surge drum (5). This evaporation stage is carried out in such a way that the residual methanol content of the mixture ranges between 5 and 25 mass %, preferably between 10 and 20 mass %.

This content is high because the methanol acts as a co-solubilizer for the naturally insoluble ester and glycerin. Liquid (D) is then cooled to 323° K. and decanted in a decantation drum (6) so as to separate the upper phase (E) rich in ester supplying the second reaction section and the lower phase (F) rich in glycerin that requires a specific treatment.

Methanol (stream G) from surge drum (5) is added to the ester phase from decantation drum (6) so as to obtain a new mixture whose ester content ranges between 20 and 80 mass %, preferably between 45 and 55 mass %. The mixture obtained is passed upward through a second reactor (7) identical to the first one and working under operating conditions very substantially close to those of reactor (2). In most cases, the operating conditions of reactors (2) and (7) are practically identical, and the catalyst used in each one of the reactors is the same. The conversion obtained at the outlet of reactor (7) allows to meet the monoglyceride specification in ester (H) that is at the maximum value of 0.8 wt. % and the di- and tri-glyceride specification in ester (H) that is at the maximum value of 0.2 wt. %.

The methanol contained in the mixture of effluents from reactor (7) is evaporated in at least one stage, preferably in two stages, in a set of evaporators (8).

The first evaporation stage is substantially identical to that carried out in evaporator (3) and the second evaporation stage is carried out under vacuum so as to leave at the maximum 500 ppm by mass of methanol in liquid (I), preferably 200 ppm, which allows to dry the ester to 200 ppm by mass of water maximum. After cooling and decantation of the heavy effluent from group of evaporators (8) in decanter (10), the high-purity glycerin phase (J) obtained is directly sent to the facility limit and the ester phase (K) obtained is subjected to a treatment described below. The methanol vapour from set of evaporators (8) is condensed in condenser (9), then recycled to the reaction sections via surge drum (5).

The raw ester (K) from decanter (10) has to be treated so as to meet the specification relative to the total glycerin content (free and bonded) that is 0.25 mass % maximum.

This raw ester treatment can be performed in different ways.

For example, the ester is possibly passed through a purification means (11) that removes the last traces of insoluble free glycerin (by passage through a coalescer for example) and/or the dissolved glycerin is for example passed on adsorbent masses, such as ion-exchange resins, in an adsorber that is not shown in FIG. 1. The final ester (L) is sent to the facility limit.

In other cases, the ester can also be treated by means of one or more stages of ester washing with water.

The transesterification reaction consuming part of the methanol, it is necessary to introduce fresh methanol (M) into the system.

Part of this fresh methanol is sent to methanol feed tank (5) and the other part can be used for regeneration of the ion-exchange resins, not shown in FIG. 1 as regards ester treatment. A stream of pure methanol is generally used to regenerate the glycerin-saturated resins. This methanol soiled by glycerin and a small amount of ester is recycled to the process upstream from the glycerin treatment. A stream of pure ester from the finished product storage is then passed on the regenerated resins. The ester soiled by methanol adsorbed on the resins is recycled to the evaporation of the second reaction section.

The main reaction implemented in the method is a succession of three balanced reactions occurring in parallel, globally referred to in the description hereafter as "the reaction".

Reaction 1:
The oil (triglyceride) reacts with a methanol molecule to give an ester molecule and a diglyceride.

Reaction 2:
The diglyceride reacts with a methanol molecule to give an ester molecule and a monoglyceride.

Reaction 3:
The monoglyceride reacts with a methanol molecule to give an ester molecule and a glycerin molecule.

In the method, the first reactor achieves at least 60% of the oil conversion, preferably at least 80% and more preferably at least 90%. The second reactor can therefore be considered to be a finishing reactor.

At the outlet of this reactor, the reaction has reached what the person skilled in the art calls thermodynamic equilibrium: the concentrations of the various constituents evolve no longer over time. These concentrations therefore only depend on the reactant and product concentrations at the reactor inlet.

The reactants are methanol, mono-, di- and tri-glycerides, and the products are glycerin and methyl esters.

At the outlet of the first reactor, equilibrium being reached, one of the products has to be removed to continue the conversion, and the glycerin is thus removed by decantation. This decantation is possible through methanol evaporation. Stream (E) at the outlet of decanter (6) predominantly contains methyl esters, methanol, glycerol and partly converted glycerides (monoglycerides, diglycerides and triglycerides), as well as water traces.

Optimization of the method notably consists in reducing the operating costs while maintaining the quality of the products obtained. These costs can be decreased by reducing the amount of methanol and/or of catalyst necessary for the method. An improvement of the method allowing to decrease the amount of methanol to be evaporated and to be condensed notably allows to reduce the consumption of steam and of cooling means required during these stages, and it therefore provides a highly favourable gain for the entire method.

The present invention falls within this context and it provides an improvement of the method allowing the operating costs to be significantly decreased.

SUMMARY OF THE INVENTION

The present invention describes a method of producing fatty acid alkyl esters and glycerin implementing a set of transesterification reactions between a vegetable or animal oil consisting of triglycerides and an aliphatic monoalcohol in the presence of a heterogeneous solid catalyst, wherein a stage of separation of the ester produced and of the bonded glycerol defined as the partly converted triglycerides is carried out, said separation occurring through a membrane.

The invention describes the facility wherein said alkyl ester production method is implemented.

DETAILED DESCRIPTION

Figure 1:
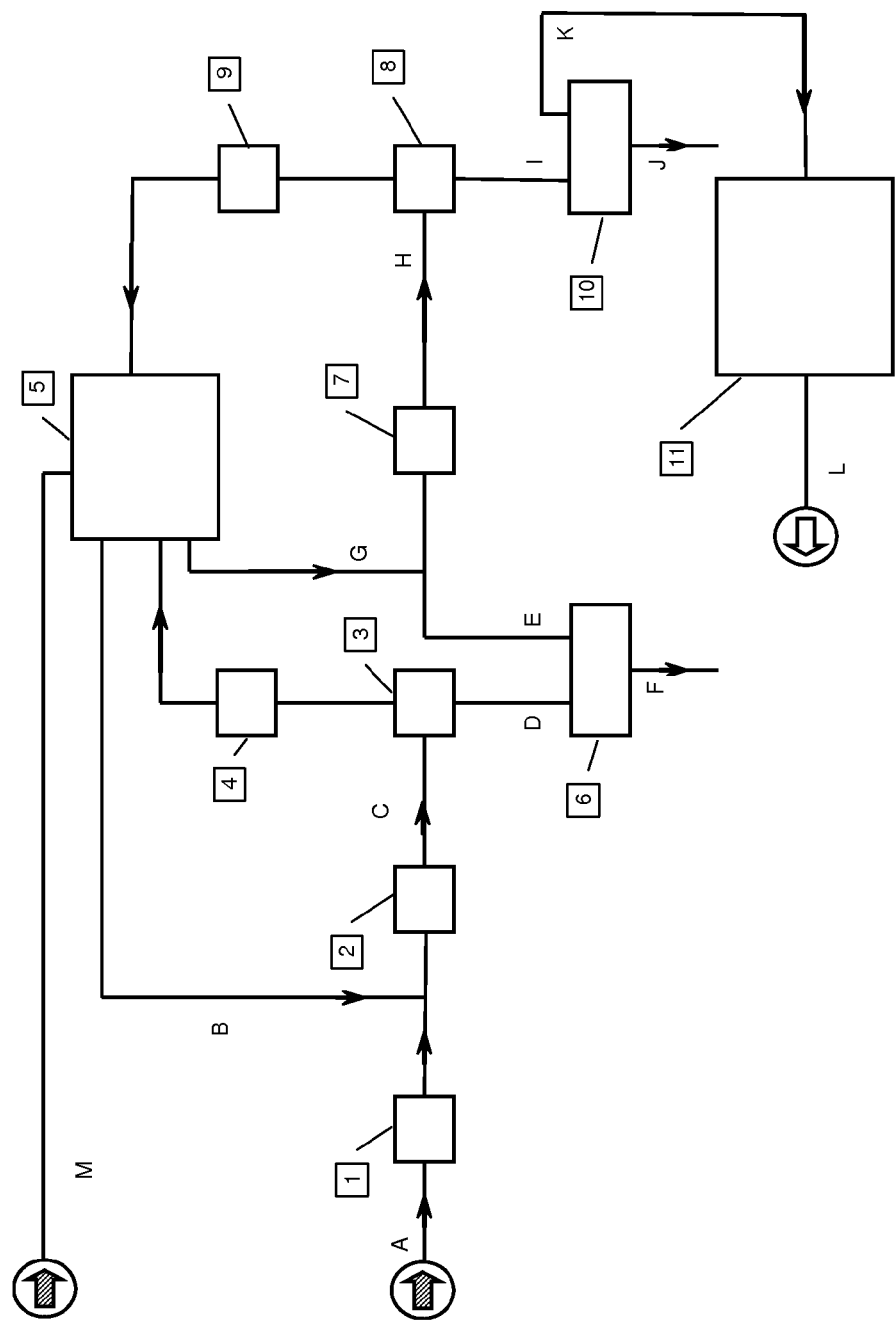
FIG. 1 diagrammatically shows the Esterfip-H™ process as described in the prior art, FIG. 2 diagrammatically shows the Esterfip-H™ process improved according to the present invention, wherein the retentate obtained after the membrane separation stage is sent to the first reactor and permeate E2 is sent to a second reaction stage, FIG. 3 diagrammatically shows the Esterfip-H™ process improved according to the present invention, wherein the retentate obtained after the membrane separation stage is sent to the first reactor and the permeate obtained after the membrane separation stage meets the specifications relative to the weakly or non converted glyceride contents, and it is directly sent to a purification section in order to remove the methanol and the glycerin without any additional conversion stage, and FIG. 4 diagrammatically shows the Esterfip-H™ process improved according to the present invention, wherein the retentate obtained after the membrane separation stage is sent to the second transesterification reactor, and the permeate meeting the specifications relative to the weakly or non converted glyceride contents is directly sent to a purification section in order to remove the methanol and the glycerin without any additional conversion stage

The present invention describes a method of producing fatty acid alkyl esters and glycerin implementing a set of transesterification reactions between a vegetable or animal oil and an aliphatic monoalcohol in the presence of a heterogeneous solid catalyst, so as to obtain an effluent comprising at least alkyl esters, free glycerol, bonded glycerol and alcohol, wherein at least one stage of separation of at least a portion of the effluent is carried out in order to separate the ester produced and the bonded glycerol, said separation consisting in a membrane separation, implementing at least one membrane permeable to water, alcohol, alkyl ester, glycerin, and poorly or non permeable to mono-, di- and tri-diglycerides, carrying out at the end of a first reaction stage conducted in a first conversion reactor (2) and performed on a stream E predominantly containing alkyl esters, alcohol, glycerol, partly converted glycerides and water traces, said stream E being obtained after separation of the produced glycerin.

A retentate (E1)) and a permeate (E2) are obtained at the end of this separation stage.

Said separation stage is carried out in a membrane separation unit comprising at least one membrane.

During the membrane separation stage, part of the weakly or non converted glycerides is retained upstream from the membrane in retentate (E1) and, consequently, the amount of bonded glycerin present in permeate (E2) sent to the second conversion reactor is smaller. This bonded glycerin, when released in the reactor, influences the equilibrium in an unfavourable manner. Thus, extracting partly converted glycerides allows, for the same equilibrium, to considerably reduce the amount of methanol required at the inlet of the second reactor. Consequently, the amount of methanol to be evaporated and condensed at the reactor outlet is thus decreased and the consumption of steam and of cooling means required for these stages is also reduced.

The membrane separation stage is carried out according to a filtration mode of "reverse osmosis" or "nanofiltration" type. In the present invention, these membrane separation operations are considered to be equivalent insofar as they use a molecular sieve type separation through a dense film that makes up the selective layer of the membrane and the stream circulating through the membrane is induced by a mechanical pressure difference between the upstream face and the downstream face of the membrane. The compounds flowing selectively through the membrane are thus the constituents of smaller size contained in the feed to be separated.

Among the constituent materials of the selective layer suited for the type of separation considered in the present invention, the person skilled in the art can mention polymers, in particular vitreous polymers, such as polyimides, polyamides, polysulfones or polyethersulfones.

The membrane separation stage is carried out over a wide temperature range, for example between −30° C. and 150° C., preferably between ambient temperature and 90° C.

The pressure differences between the two faces of at least one of the membranes that make up the membrane separation unit and suited for the desired separation are those conventionally encountered in the spheres of reverse osmosis and nanofiltration, i.e. between 1 and 15 MPa, preferably between 2 and 8 MPa.

The extraction ratio of a membrane is defined as the ratio of the permeate stream (i.e. the feed fraction that has passed through the membrane) to the feed stream at the membrane inlet. A membrane separation unit whose extraction ratio is at least 50% is preferably selected.

The selectivity of a membrane is defined by the rejection ratio R (or retention ratio) of the species (bonded glycerol here) that the membrane is supposed to retain:

$$R = 1 - \frac{Cp}{Co}$$

where Co is the bonded glycerol concentration of the feed at the inlet and Cp the bonded glycerol concentration in the permeate.

The bonded glycerol retention ratio of the membrane separation unit is at least above 30% and preferably above 50%.

According to the separation performances of the membrane used, several process schemes can be considered.

Figure 2:
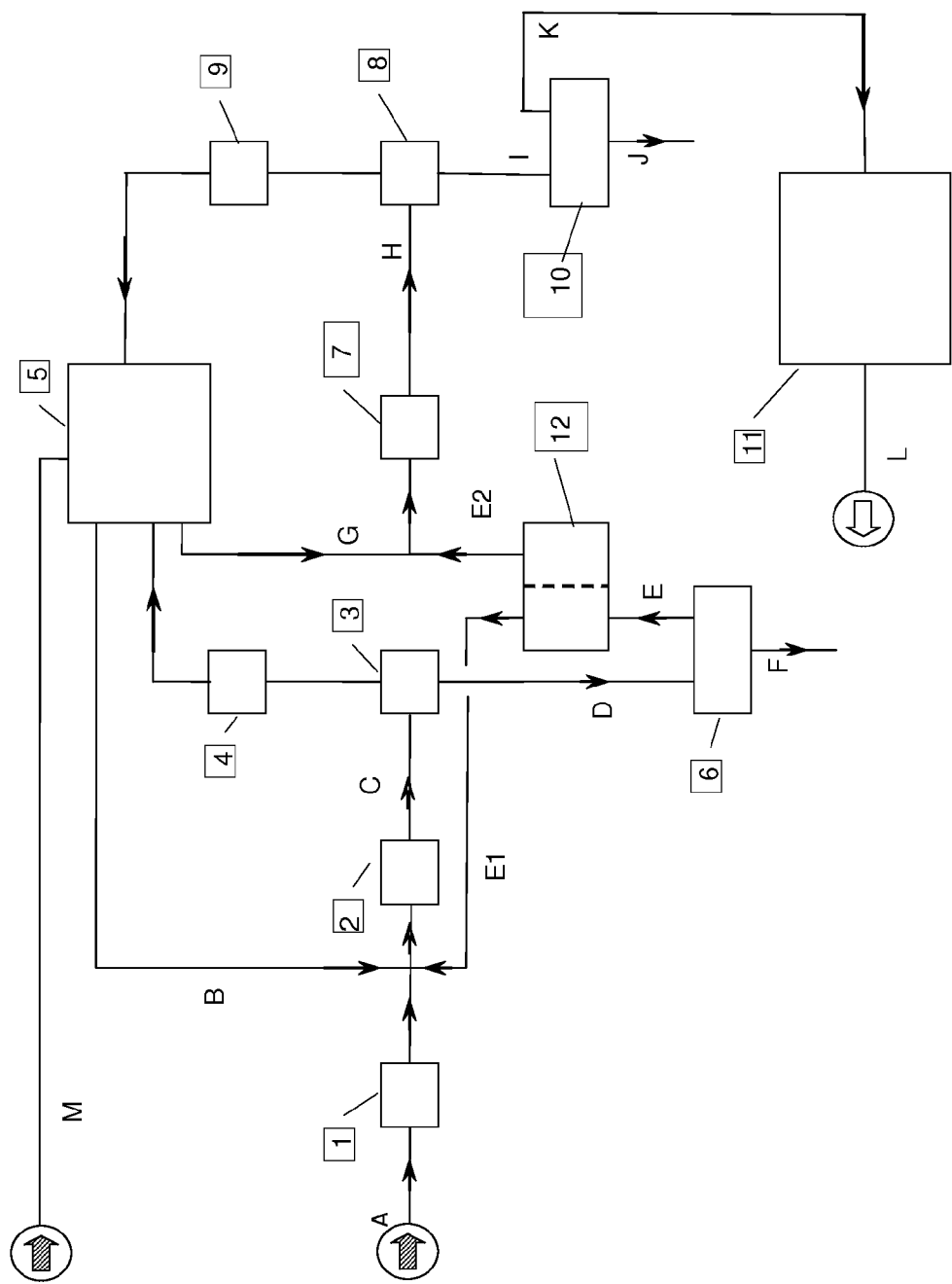
Figure 3:
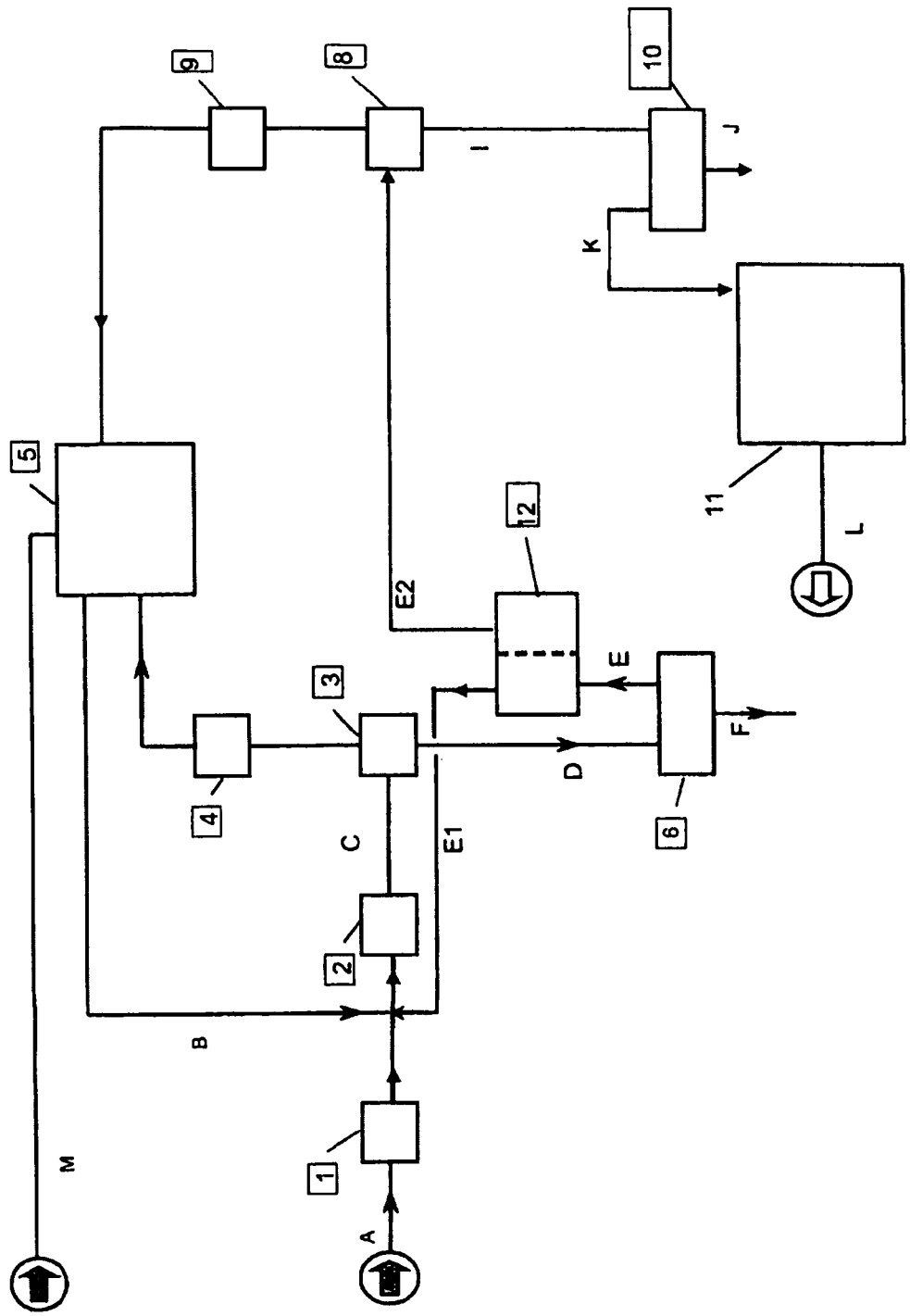
Figure 4:
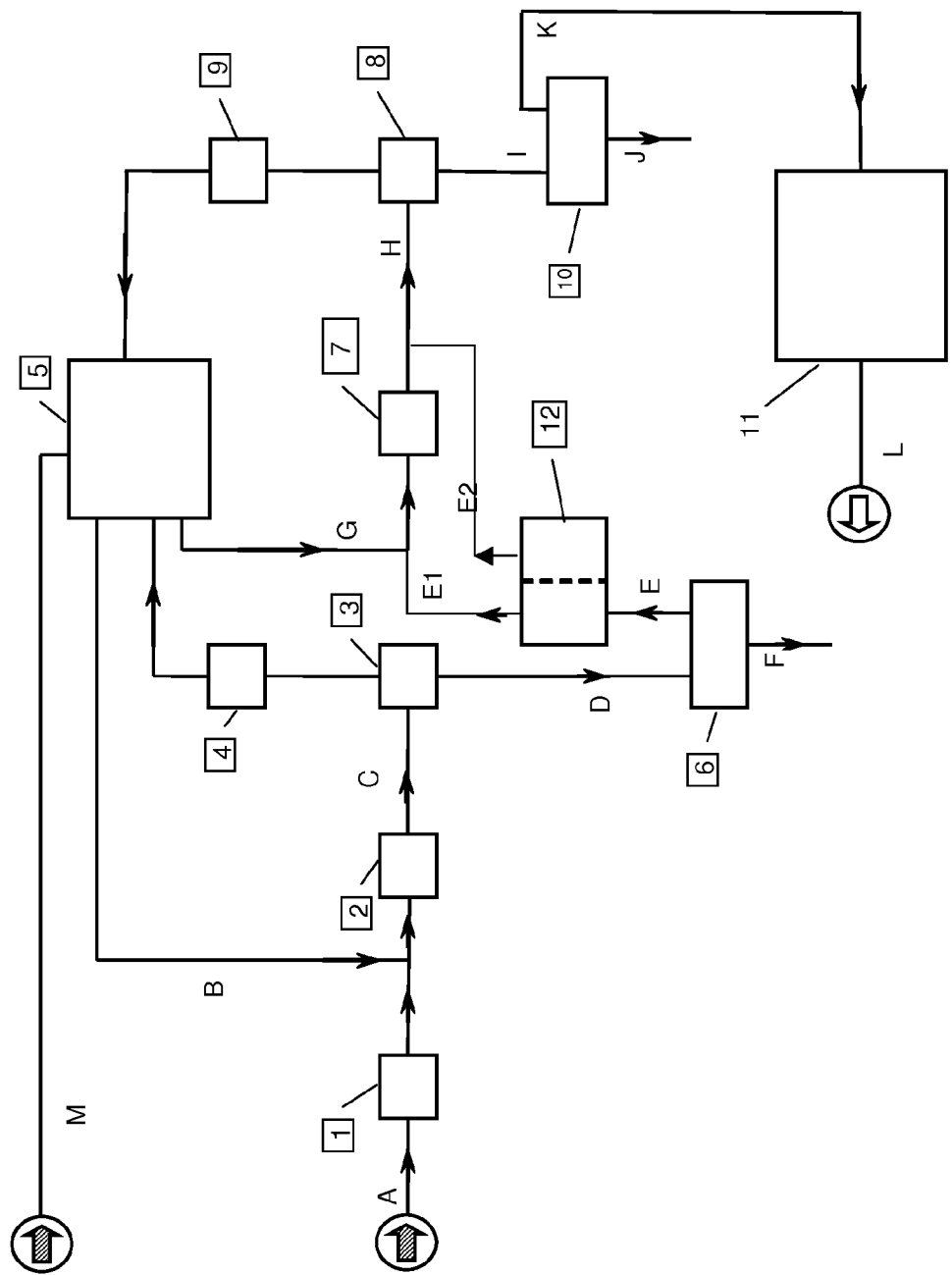

Different embodiments in accordance with the present invention are illustrated in FIGS. 2 to 4. The various elements described in these figures have the same reference numbers as those described in FIG. 1 representative of the prior art.

The membrane separation stage can be followed by a second reaction stage carried out in a second conversion reactor (7).

According to a first embodiment shown in FIG. 2, stream E is sent to membrane separation unit (12) at the outlet of which two streams E1 and E2 are obtained. Stream E1 corresponding to the retentate (i.e. all the compounds that do not pass through the membrane) containing the major part of the non-converted tri- and di-glycerides is recycled to the inlet of first conversion reactor (2), and permeate E2 is sent to second conversion reactor (7). Recycling stream E1 to the inlet of first reactor (2) with the feed oil only has a minimum influence on the equilibrium because first reactor (2) performs the major part of the conversion on a feed very predominantly consisting of triglycerides. The amount of bonded glycerin recycled is negligible in comparison with the amount of incoming bonded glycerin. Permeate E2 containing the ester, the methanol and a lower proportion of mono-, di- and tri-glycerides is sent to the inlet of second reactor (7). The flow rate of methanol sent to reactor (2) can be considerably reduced. In fact, having a membrane separation unit that recycles the weakly or non converted glycerides allows to degrade the conversion of reactor (2) by lowering the methanol to oil ratio without any appreciable consequences on the effluent sent to second conversion reactor (7). Lowering the methanol to oil ratio at the inlet of first conversion reactor (2) has a double effect on the utility consumption. The decrease in the flow rate of the feed sent to first reactor (2) induces a decrease in the heat load required for heating this stream to the reaction conditions. Furthermore, the amount of methanol evaporated in evaporator (3) is thus reduced, hence a decrease in the heat load required for cooling and condensing the methanol in condenser (4). The process utilities can therefore be considerably reduced.

According to a second embodiment of the present invention, the membrane separation stage carried out in separation unit (12) is such that it is possible to recover a permeate E2 meeting the biodiesel specifications as regards the glyceride content. It is then possible to send stream E2 without any additional conversion stage to optional purification stages. Stream E2 can then be sent to the purification section that optionally comprises an alcohol evaporation means (8), optionally an insoluble glycerin separation means (10) and optionally a final purification means (11) allowing to remove the traces of insoluble free glycerin and dissolved glycerin, and each one of these means can be used alone or in combination.

Preferably, in this second embodiment and according to the diagram shown in FIG. 3, retentate E1 enriched in glycerides but having an ester concentration that depends on the extraction ratio of the membrane, which is possibly high, can then be recycled to the inlet of first conversion reactor (2). Permeate E2 can be directly sent to a purification section optionally comprising an alcohol evaporation means (8), optionally an insoluble glycerin separation means (10) and optionally a final purification means (11) allowing to remove the traces of insoluble free glycerin and dissolved glycerin. Permeate E2 thus undergoes no additional conversion stage.

More preferably in this second embodiment and according to the diagram shown in FIG. 4, retentate E1 can be sent to a second transesterification reactor (7), notably of smaller size than in the prior art described in FIG. 1. The higher the membrane extraction ratio, the smaller the size of the reactor. Permeate E2 meeting the specifications relative to weakly or non converted glyceride contents is directly sent downstream from second conversion reactor (7). It is thus mixed with the effluent leaving second reactor (7) prior to being sent to the purification section optionally comprising an alcohol evaporation means (8), optionally an insoluble glycerin separation means (10) and/or optionally a final purification means (11).

The present invention also describes the facility wherein the method is implemented. This facility comprises:
- at least one drying means (1) into which the feed oil is fed,
- at least a first transesterification reactor (2) comprising, at the inlet thereof, at least one dried feed oil delivery line and at least one alcohol delivery line,
- at least one alcohol evaporation means (3), arranged after the first transesterification reactor, comprising at the outlet thereof at least one line connected to an evaporated alcohol condensation means (4) and at least one line through which the phase freed of the methanol vapour is extracted,
- at least one separation means (6) for separating the glycerin-rich phase and the ester-rich phase,
- at least one membrane separation unit (12) arranged after separation means (6) and into which the stream corresponding to the ester-rich phase is sent, the streams obtained at the outlet of said separation unit being retentate E1, comprising the mono-, di- and tri-glycerides retained by said unit, and permeate E2 comprising the alcohol, the water, the alkyl ester and the glycerin,
- optionally a second transesterification reactor located downstream from the membrane separation unit,
- at least one fresh and/or recycle alcohol collection means (5),
- optionally a purification section optionally comprising an alcohol evaporation means (8), optionally an insoluble glycerin separation means (10) and/or optionally a final purification means (11).

The membrane separation unit can consist of several filtration stages arranged in series, in parallel or according to any layout known to the person skilled in the art. Thus, in a separation unit provided with two filtration stages in series, the second stage can be used for filtering the permeate coming from the first membrane separation stage, which can therefore allow separation to be improved.

Identical or different membranes can be used at each filtration stage.

According to the embodiment described in FIG. 2, the facility furthermore comprises:
- at least one line at the outlet of separation unit (12) through which retentate E1 is sent upstream from the first transesterification reactor,
- at least one line at the outlet of separation unit (12) in which permeate E2 is mixed with recycle alcohol from storage means (5) prior to being sent to the second transesterification reactor.

According to the embodiment described in FIG. 3, the facility furthermore comprises:
- at least one line at the outlet of separation unit (12) through which retentate E1 is sent upstream from the first transesterification reactor,
- at least one line at the outlet of separation unit (12) through which permeate E2 is directly sent to said purification section.

According to the embodiment described in FIG. 4, the facility furthermore comprises:
- at least one line at the outlet of separation unit (12) through which retentate E1 is sent upstream from second transesterification reactor (7),
- at least one line at the outlet of separation unit (12) in which permeate E2 is mixed with the stream leaving second transesterification reactor (7) prior to being sent to said purification section.

EXAMPLES

In the following examples, the methanol and the glycerol for which the membrane is not selective are not taken into account in the material balances.

Furthermore, the various streams A, B, E, G and L correspond to those shown in the figures and they are, respectively, the feed oil, the recycle methanol introduced before the first reactor, the ester-rich phase from the first reactor, the recycle methanol introduced before the second reactor and the final ester.

Example 1

Not in Accordance with the Invention

This example shows the basic scheme of the Esterfip-H™ process as described in FIG. 1. The material balance on the various streams of interest circulating in this process is described in Table 1.

TABLE 1

Material balance on a conventional Esterfip-H ™ process

|  | A | B | E | G | L |
|---|---|---|---|---|---|
| Cumulative glyceride + ester flow (t/h) | 10 | — | 10 | — | 10 |
| % triglycerides (m/m) | 100 | — | 2.4 | — | 0.2 |
| % diglycerides (m/m) | — | — | 1.0 | — | 0.2 |
| % monoglycerides | — | — | 2.2 | — | 0.8 |
| % ester | — | — | 88.5 | — | 98.8 |
| Methanol flow (t/h) | — | 9 | 0.6 | 5.4 | — |

The operating costs linked with the use of methanol and the amount of catalyst required in both reactors to meet the glyceride specifications are described in Table 2.

TABLE 2

Utilities consumed for methanol management in a conventional Esterfip-H ™ process and required catalyst amount

| Utility | Hourly consumption |
|---|---|
| Cooling energy | W (kW) |
| Heating energy | X (kW) |
| Catalyst volume (reactor No. 1) | Y (t) |
| Catalyst volume (reactor No. 2) | Z (t) |

Example 2

According to the Invention

This example is in accordance with the embodiment described in FIG. 2. The performances of a membrane separation stage are given in Table 3. The performances are typically those of a membrane having a selective layer based on polyimide that has been subjected to a thermal post-treatment.

TABLE 3

Performances of the glyceride fractionating membrane

| Criterion | Performance |
|---|---|
| Extraction ratio | 75% |
| Triglyceride rejection ratio | 73% |
| Diglyceride rejection ratio | 64% |
| Monoglyceride rejection ratio | 40% |
| Ester rejection ratio | 0% |

The balance of the streams circulating in the process according to the present invention is detailed in Table 4 and the associated utility consumptions are described in Table 5. It can be observed that the utilities in this new process scheme are reduced in relation to the scheme of the prior art as described in Example 1.

TABLE 4

Material balance on an Esterfip-H ™ process equipped with a membrane separation stage (as described in FIG. 2)

| | A | B | E | E1 | E2 | G | L |
|---|---|---|---|---|---|---|---|
| Cumulative glyceride + ester flow (t/h) | 10 | — | 13.8 | 3.5 | 10.3 | — | 10 |
| % triglycerides (m/m) | 100 | — | 8.1 | 25.9 | 2.2 | — | 0.2 |
| % diglycerides (m/m) | — | — | 2.8 | 8.2 | 1.0 | — | 0.2 |
| % monoglycerides | — | — | 3.7 | 8.3 | 2.3 | — | 0.8 |
| % ester | — | — | 83.1 | 57.7 | 91.6 | — | 98.8 |
| Methanol flow (t/h) | — | 5.4 | 0.2 | — | — | 5.2 | — |

TABLE 5

Utilities consumed for methanol management in an Esterfip-H ™ process equipped with a membrane separation stage (as described in FIG. 2)

| Utility | Hourly consumption |
|---|---|
| Cooling energy | 0.746 W (kW) |
| Heating energy | 0.826 X (kW) |
| Catalyst volume (reactor No. 1) | Y (t) |
| Catalyst volume (reactor No. 2) | Z (t) |

Example 3

According to the Invention

This example corresponds to the embodiment described in FIG. 4. The performances of a membrane separation stage are identical to those used in Example 2. The membrane separation unit uses two filtration stages in series, the second stage being used for filtering the permeate coming from the first membrane separation stage. As shown in Table 6, the glyceride concentrations in the permeate (stream E2, FIG. 4) of the second membrane separation stage meet the glyceride content specifications for a commercial diester (Table 6). This stream E2 therefore requires no passage through a second transesterification reactor. Stream E1 consisting of the mixture of the two respective retentates of the two filtration stages being enriched in glycerides, it requires a post-treatment in a second reactor (reference number 7 in FIG. 4) in order to reach the glyceride specifications. However, considering the reduced glyceride content and the significant reduction in the stream flowing into this second reactor, the amount of methanol required in this stage is reduced in relation to the reference case. This naturally leads to a reduction in the utilities required to reach the specifications (see Table 7). Furthermore, considering the reduced glyceride content and the significant reduction in the stream flowing into this second reactor, the method requires 50% less catalyst in this second reactor (7) in relation to the prior art (Example 1).

TABLE 6

Material balance on an Esterfip-H ™ process equipped with a membrane separation stage (as described in FIG. 4)

| | A | B | E | E1 | E2 | G | L |
|---|---|---|---|---|---|---|---|
| Cumulative glyceride + ester flow (t/h) | 10 | — | 10 | 4.7 | 5.3 | — | 10 |
| % triglycerides (m/m) | 100 | — | 2.4 | 5.3 | 0.2 | — | 0.2 |
| % diglycerides (m/m) | — | — | 1.0 | 2.1 | 0.2 | — | 0.2 |
| % monoglycerides | — | — | 2.2 | 3.9 | 0.8 | — | 0.8 |
| % ester | — | — | 88.5 | 88.6 | 88.4 | — | 98.8 |
| Methanol flow (t/h) | — | 9 | 0.6 | — | — | 3.4 | — |

TABLE 7

Utilities consumed for methanol management in an Esterfip-H ™ process equipped with a membrane separation stage (as described in FIG. 4)

| Utility | Hourly consumption |
|---|---|
| Cooling energy | 0.844 W (kW) |
| Heating energy | 0.899 X (kW) |
| Catalyst volume (reactor No. 1) | Y (t) |
| Catalyst volume (reactor No. 2) | 0.5 Z (t) |

The preceding examples can be repeated with similar success by substituting the generically or specifically described reactants and/or operating conditions of this invention for those used in the preceding examples.

In the foregoing and in the examples and, all parts and percentages are by weight, unless otherwise indicated.

The entire disclosures of all applications, patents and publications, cited herein and of corresponding FR application Ser. No. 08/07.415, filed Dec. 23, 2008. are incorporated by reference herein.

The invention claimed is:

1. A method for producing fatty acid alkyl esters and glycerin, comprising implementing a set of transesterification reactions between a vegetable or animal oil and an aliphatic monoalcohol in the presence of a heterogeneous solid catalyst, so as to obtain an effluent comprising at least (a) alkyl esters, (b) glycerin containing free glycerol, (c) bonded glycerol and (d) alcohol, conducting at least one stage of membrane separation on a stream E in order to separate the ester produced and the bonded glycerol, said separation implementing at least one membrane permeable to water, alcohol, alkyl ester, glycerin, and poorly or non permeable to mono-, di- and tri-diglycerides, said membrane separation being conducted at the end of a first reaction stage having been conducted in a first conversion reactor (2) and performed on said stream E predominantly containing alkyl esters, alcohol, glycerol, partly converted glycerides and water traces, said stream E being obtained after separation of glycerin F, produced in said first conversion reactor (2), by decanting said effluent into stream E and glycerin F.

2. A method as claimed in claim 1, wherein a retentate (E1) and a permeate (E2) are obtained at the end of said membrane separation stage.

3. A method as claimed in claim 1, wherein the membrane separation stage is conducted in a membrane separation unit comprising at least one membrane, at a temperature ranging between −30° C. and 150° C.

4. A method as claimed in claim 1, wherein between two faces of at least one of the membranes making up the membrane separation unit a pressure difference ranges between 1 and 15 MPa.

5. A method as claimed in claim 1, wherein the membrane separation unit is conducted with an extraction ratio of at least 50%.

6. A method as claimed in claim 1, wherein the membrane separation unit is conducted with a bonded glycerol retention ratio of at least above 30%.

7. A method as claimed in claim 1, wherein the membrane separation stage is followed by a second reaction stage carried out in a second conversion reactor (7).

8. A method as claimed in claim 7, wherein retentate (E1) containing the major part of the non-converted tri- and diglycerides is recycled to the inlet of the first conversion reactor (2) and permeate (E2) is sent to second conversion reactor (7).

9. A method as claimed in claim 7, wherein retentate (E1) is sent to the second reactor and permeate (E2) is mixed with the effluent leaving second reactor (7) prior to being sent to a purification section optionally comprising an alcohol evaporation means (8), optionally an insoluble glycerin separation means (10) and/or optionally a final purification means (11).

10. A method as claimed in claim 1, wherein permeate (E2), whose glyceride content meets specifications relative to weakly or non converted glyceride contents, is directly sent to a purification section optionally comprising an alcohol evaporation means (8), optionally an insoluble glycerin separation means (10) and/or optionally a final purification means (11).

11. A method according to claim 3 wherein said temperature is from ambient to 90° C.

12. A method according to claim 4 wherein the pressure difference is between 4 and 8 MPa.

13. A method according to claim 6 wherein said bonded glycerol retention ratio is above 50%.

14. A method according to claim 4, wherein said pressure difference ranges between 2 and 8 MPa.

* * * * *